Jan. 1, 1929.

W. E. HOKE

1,697,118

SELF LOCKING COUPLED SCREW ELEMENT

Filed Nov. 1, 1927    2 Sheets-Sheet 1

INVENTOR
William E. Hoke
BY
ATTORNEYS

Jan. 1, 1929.
W. E. HOKE
1,697,118
SELF LOCKING COUPLED SCREW ELEMENT
Filed Nov. 1, 1927
2 Sheets-Sheet 2

INVENTOR
William E. Hoke
BY
ATTORNEYS

Patented Jan. 1, 1929.

1,697,118

UNITED STATES PATENT OFFICE.

WILLIAM E. HOKE, OF BALTIMORE, MARYLAND, ASSIGNOR, BY MESNE ASSIGNMENTS, TO DARDELET THREADLOCK CORPORATION, OF NEW YORK, N. Y., A CORPORATION OF DELAWARE.

SELF-LOCKING COUPLED SCREW ELEMENT.

Application filed November 1, 1927. Serial No. 230,301.

This invention relates to improvements in self-locking coupled screw elements, such as bolts and nuts, and has for its objects to provide a screw thread connection between two members wherein interengaged male and female screw threads of equal and constant pitch have helicoidal abutment surface portions corelated to permit substantial side play between the engaged threads within positively fixed limits, and helicoidal self-locking surface portions curved transversely of the threads, coactive initially to freely turn in contact to advance one member relatively to the other at the pitch rate and finally coactive upon full taking up of the side play in one direction to mutually hold each other against accidental sidewise movement in the opposite direction and accidental turning movement, the abutment portions being coactive to permit further advance of the traveling member at the pitch rate after the self-locking portions are displaced into self-holding relation; to provide a screw thread connection between two members wherein interengaged male and female screw threads of the same constant pitch are displaceable crosswise of each other from free-turning relation into self-locking relation, the engaged male and female threads having helicoidal transversely curved surface portions initially coactive to advance one member relatively to the other at the pitch rate and displaceable crosswise of each other while in contact into self-locking relation by reaction force resisting such advance; to provide a screw thread connection between two members wherein interengaged male and female screw threads of the same constant pitch have coacting helicoidal transversely curved surface portions coactive to advance one member relatively to the other at the pitch rate and readily displaceable crosswise of each other while in contact from free-turning relation into self-locking relation by reaction force resisting such advance, and wherein said engaged threads have helicoidal surface portions adapted to be brought into engagement upon displacement of the first-mentioned surface portions into self-locking relation and adapted to resist great reaction force tending to displace the first mentioned surface portions into self-locking relation; to provide a screw thread connection between two members wherein the male and female threads have two sets of coactive transversely curved helicoidal surface portions displaceable simultaneously crosswise from free-turning relation into self-locking relation, and coactive helicoidal surface portions engageable with each other to limit positively the extent of crosswise thread displacement in a direction for effecting self-locking engagement between said sets of transversely curved surface portions.

My invention also includes providing a screw thread connection for two members in which engaged male and female threads of constant and equal pitch are displaceable crosswise of each other from free-turning relation into self-locking relation, and in which the threads have no flat surfaces and no sharp angular corners as viewed in cross-section; and also providing a screw thread connection of this kind in which the threads have one or more sets of coactive helicoidal self-locking surface portions displaceable while in contact into self-locking relation by reaction force tending to displace the threads in one direction, and also have a set of helicoidal abutment surface portions coactive to prevent additional thread displacement in said direction after the first-mentioned surface portions are brought into self-locking relation.

My invention also has for certain of its objects to provide a separable screw connection for two members, such as a bolt or nut, capable of repeated connecting and disconnecting operations, wherein the separable male and female threads have coacting helicoidal surface portions curving transversely of the threads and displaceable transversely of each other while in contact, from free-turning relation into self-locking relation by reaction force resisting screwing movement in the direction of connection; and to provide a connection of this kind wherein the threads have helicoidal abutment portions engageable only after such displacement of the transversely curved self-locking surfaces and adapted to prevent positively additional crosswise thread displacement by said reaction force and to coact to permit additional screwing movement between the members in the direction of connection.

My invention also includes providing a tight-clamping fastening means, such as a bolt and nut for example, adapted to withstand great stresses tending to cause unclamping of the work, wherein engaged male and female threads on the work-clamping members are adapted to be automatically locked together against accidental movements effective to relieve the clamping effect and are of such contour that the threads may be cut with great speed and ease and with a minimum of wear of the cutter.

Other objects, advantages, and novel features of the invention will appear from the following description in detail of the several embodiments of the invention shown in the accompanying drawings. It will be understood that the invention is not limited in its application to a coupled nut and bolt, or to the forms of coacting male and female threads illustrated in the drawings, the scope of the invention being defined by the appended claims.

Referring first to the construction shown in Figs. 1 to 4, the bolt has a shank 10, formed with a male screw thread 11 at one end and a head 12 at the other end, and the bolt shank passes through aperture 13 and 14 in two abutting work pieces 15 and 16 which are clamped together between the bolt head 12 and a nut 17 screwed on the threaded end of the bolt shank tightly up against the outer face of work piece 16, the female thread 18 on the nut being in self-locking engagement with the male thread 11 of the bolt. The bolt and nut are preferably formed of metal. The formation and operation of the threads 11 and 18 are more clearly shown in Figs. 2, 3 and 4.

Figure 1:
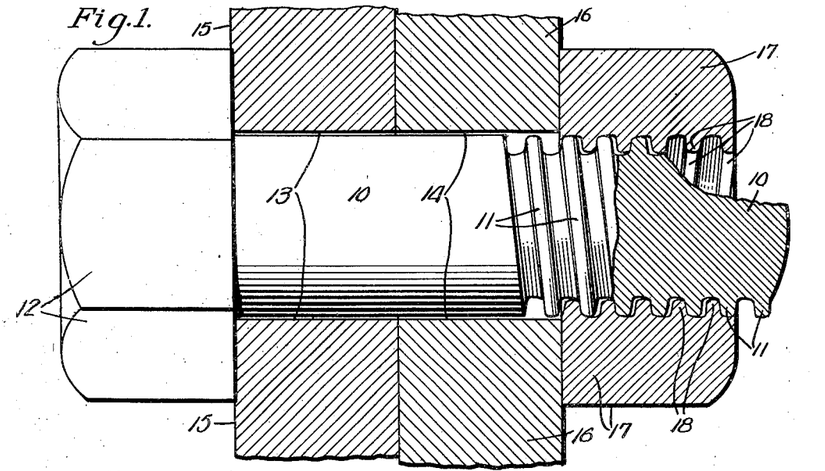
Figure 1 is a view partly in longitudinal section, showing a bolt and nut embodying the invention in work-clamping position with the engaged bolt and nut threads in self-locking relation.
Figure 2:
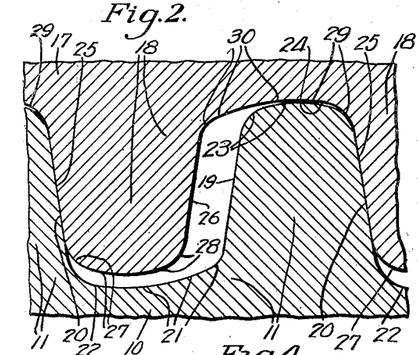
Figs. 2, 3 and 4 are fragmentary sectional views on an enlarged scale, showing the threads of the bolt and nut disclosed in Fig. 1 in off-screwing relation, initial on-screwing relation, and final on-screwing self-locked relation, respectively, the bolt head being assumed to be at the left as in the case of Fig. 1.
Figure 3:
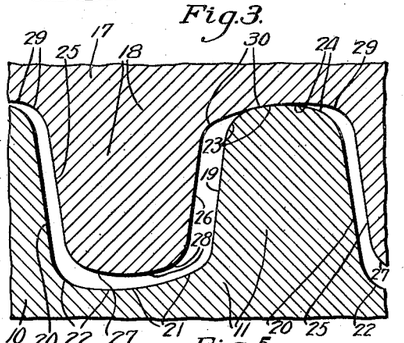
Figure 4:
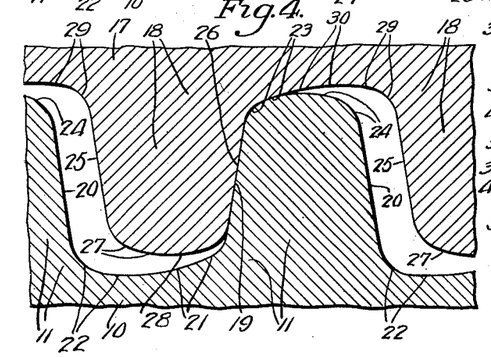

The bolt thread 11 has a pair of oppositely facing, helicoidal, abutment surface portions 19 and 20 of zero transverse curvature. These abutment surface portions each make an angle with the axial line of the bolt greater than the angle of friction of the bolt and nut material, and, preferably, diverge slightly from each other toward the axial line of the bolt, as shown. The edges of the abutment surface portions 19 and 20 nearest the axial line of the bolt merge with the inner edges of two oppositely facing, helicoidal, transversely curved thread-surface portions 21 and 22 which slope in opposite directions toward the axial line of the bolt away from the abutment portions, the outer edge of portion 21 of each thread convolution meeting the outer edge of portion 22 of an adjacent thread convolution at the lowest part of the thread groove in the bolt. Portions 21 and 22 thus form a concave bottom for the thread groove of the bolt, the curvature of which in a cross-section of the thread is preferably such that the sides thereof so join the abutment portions as to form decidedly rounded corners, as shown. The edges of abutment portions 19 and 20 farthest from the axial line of the bolt merge with the outer edges of two oppositely facing, helicoidal, transversely curved, thread surface portions 23 and 24 the inner edges of which meet at the highest part of the thread rib of the bolt. Portions 23 and 24 slope in opposite directions away from their meeting edges toward the axial line of the bolt, and form a convex top surface for the thread rib. The outer section of each portion 23 and 24 is preferably given a much more decided curvature than the inner section so that they so join the abutment portions 19 and 20 as to form decidedly rounded corners, as shown. The inner section of portion 23 is given such a slight curvature toward the axial line of the bolt from the top of the thread rib that it has a slope relatively to said axial line within the angle of friction of the bolt and nut material.

The nut thread 18 has a pair of oppositely facing, helicoidal, abutment surface portions 25 and 26 of zero transverse curvature each making an angle with the axial line of the thread greater than the angle of friction. Surface portions 25 and 26 are arranged opposite surface portions 20 and 19, respectively, of the bolt thread and parallel therewith, said surface portions 25 and 26 converging slightly toward each other toward the axial line of the thread. The side edges of abutment portions 25 and 26 located nearest the axial line of the thread merge with the outer edges of two oppositely facing, helicoidal, transversely curved, thread surface portions 27 and 28 the inner edges of which meet at the highest part of the thread rib on the nut. Portions 27 and 28 slope in opposite directions from their meeting edges away from the axial line of the nut and form a convex top surface for said thread rib. The outer sections of portions 27 and 28 are preferably given a more decided curvature than the inner sections thereof so that said outer sections so join abutment portions 25 and 26 as to form decidedly rounded corners, as shown. The edges of the abutment surface portions 25 and 26 farthest from the axial line of the nut merge with the inner edges of two oppositely facing, helicoidal, transversely curved, thread-surface portions 29 and 30 which slope in opposite directions from the abutment surface portions away from the axial line of the nut, the outer edge of portion 29 of each thread convolution meeting the outer edge of portion 30 of an adjacent thread convolution at the lowest part of the thread groove of the nut. Portions 29 and 30 thus form a concave bottom for the thread grove of the nut. The inner sections of portions 29 and 30 are preferably given a decidedly greater curvature than their outer sections so that they so merge with the abutment portions 25 and 26 as to form decidedly rounded corners, as shown. Portion 30 is so curved transversely that its decidedly curved section is relatively narrow with respect to the total width of said portion, and so that the remaining relatively wide outer section thereof has a slope relatively to the axial line of the nut within the angle of friction.

The threads 11 and 18 are of equal pitch and the pitch of each thread is constant from end to end of the thread. The thread contours are corelated to permit substantial crosswise displacement of the threads while engaged, the thread rib on each thread being substantially narrower than the thread groove of the other thread, as shown, so that there is provision for substantial maximum side play between the threads the extent of which is adapted to be positively limited by the abutment portions of the threads. The thread contours are also corelated to afford a clearance between surface portions 27, 28, 29 and 30 on the nut thread and surface portions 22, 21, 24 and 23 on the bolt thread, when positioned as shown in Fig. 2 or in any neutral position intermediate the positions shown in Figs. 2 and 3, so that the nut may be easily started on the bolt. The surface portions 27 and 28 on the nut thread and the surface portions 22 and 21 on the bolt thread, and surface portion 29 on the nut thread and surface portion 24 on the bolt thread, are so curved and corelated that they cannot engage and coact to take axial reaction forces either in screwing the nut on the bolt or in screwing the nut off the bolt, as shown in Figs. 2, 3 and 4.

In screwing the nut on the bolt, to clamp the work, the outer section of surface portion 30 of the nut thread abuts and turns in light contact with the inner section of surface portion 23 of the bolt thread, as shown in Fig. 3, to initially advance the nut to the work at the pitch rate. As the reaction of the work against the advancing nut comes into play the rate of advance of the nut per turn will decrease until, as the nut is tightened up, the nut and bolt threads are displaced crosswise of each other sufficiently to bring abutment portion 26 of the nut thread against abutment portion 19 of the bolt thread, as shown in Fig. 4, after which further crosswise displacement in the same direction is positively prevented.

The displacement of the threads from the free-turning relation shown in Fig. 3 to the relation shown in Fig. 4 causes the wide slightly sloping outer section of surface portion 30 of the nut thread to move crosswise over the relatively narrow slightly sloping inner section of surface portion 23 of the bolt thread while in engagement therewith, thereby very slightly expanding the nut thread radially of the nut, so that these engaged helicoidal sections of the nut and bolt threads will be tightly jammed one on the other. As these jammed surface sections lie within the angle of friction relatively to the axial line of the nut and are gripped together by the elastic tension of the nut, it will be obvious that the nut and bolt threads are at this time tightly locked together against accidental relative turning movement, and also securely hold each other against accidental displacement to the relative positions of the threads shown in Figs. 3 or 2. The threads are therefore self-locked and will remain locked even though play should develop between the work on the one hand and the bolt head and nut on the other hand.

It will be evident, however, that if further screwing on of the nut be necessary in order to secure the desired degree of clamping effort on the work, the nut may be additionally advanced at the pitch rate per turn by means of the wrench, since abutment portions 19 and 26 will now coact to advance the nut without permitting any additional crosswise displacement between the jammed sloping surface portions and, accordingly, without increasing the stresses imposed on the jammed surfaces. The nut may, therefore, be screwed up to the work as firmly as possible without danger of bursting the nut. The self-locking surface sections of the two threads and the abutment surface portions of the threads are corelated to permit jamming of the locking surfaces into self-locking relation and arrest of the jamming movement by the abutment portions before the generation of radial stresses exceeding the elastic limit of the nut.

It will be noted that the width of the abutment portions is such that these surfaces afford abrupt axial reaction resisting faces at the sides of the threads extending in an up and down direction the major portion of the total thread depth, so that the thread is adapted to withstand great axial load stresses. The outer section of surface portion 23 of the bolt thread is preferably given a somewhat less sharp curvature than the narrow inner section of portion 30 of the nut thread, as most clearly shown in Fig. 4, so that there will be a slight clearance between these surface sections when the abutment portions contact. This insures self-locking of the two threads and engagement of abutments 19 and 26 after such locking without requiring the greatest accuracy in cutting the curved surface portions 30 and 23.

Figure 5:
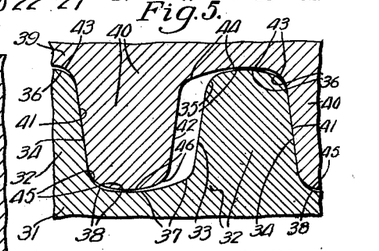
Fig. 5 is a view similar to Fig. 2, showing the engaged bolt and nut threads having an additional set of coactive surface portions for the initial screwing on of the nut and self-locking of the engaged threads, so that each thread will take a self-locking grip on the other thread along two helicoidal surface portions instead of one (as is the case with the construction shown in Figs. 1 to 4) when the nut is screwed up against the work.

In Fig. 5 is shown a slightly modified threaded connection wherein the male and female screw threads are formed as in the case of the construction shown in Figs. 1 to 4, except that the top of the nut thread rib and the bottom of the bolt thread groove are, in Fig. 5, also curved and corelated to provide coactive self-locking surfaces arranged so that the two threads will become locked together along two helicoidal surface portions of each thread instead of one. In this construction the bolt 31 has its thread 32 formed with a pair of helicoidal, oppositely facing, abutment surface portions 33 and 34 of zero transverse curvature similar to portions 19 and 20 of thread 11 of bolt 10, a pair of helicoidal, oppositely facing, transversely curved, surface portions 35 and 36 similar to portions 23 and 24 of said thread 11, and a pair of helicoidal, oppositely facing, transversely curved, surface portions 37 and 38 in lieu of portions 21 and 22 of said thread 11. The nut 39 has its thread 40 formed with a pair of helicoidal, oppositely facing, abutment surface portions 41 and 42 of zero transverse curvature similar to portions 25 and 26 of thread 18 of nut 17, a pair of helicoidal, oppositely facing, transversely curved, surface portions 43 and 44 similar to portions 29 and 30 of said thread 18, and a pair of helicoidal, oppositely facing, transversely curved, surface portions 45 and 46 in lieu of surface portions 27 and 28 of said thread 18.

Surface portions 45 and 46 of the nut thread are curved from their meeting edges at the highest part of the nut thread rib away from the axial line of the thread to the adjacent edges of abutment portions 41 and 42, preferably having their outer sections given a greater curvature so that these surfaces so merge with the abutment portions as to form decidedly rounded corners. The curvature of the inner section of portion 46 is such that it slopes from the highest part of the thread rib away from the axial line of the nut within the angle of friction relatively to said axial line. Surface portions 37 and 38 of the bolt thread curve transversely from the lowest part of the bolt thread groove (where the outer edges of said portions of adjacent convolutions of the thread meet) to their inner edges away from the axial line of the bolt, and the inner sections of these portions are given a greater curvature than the outer sections thereof so as to so merge with the adjacent edges of the abutment portions as to form decidedly rounded corners. The curvature of the outer section of portion 37 is such that it slopes from the lowest part of the thread groove away from the axial line of the bolt within the angle of friction relatively to said line. There is only a slight clearance between portions 45 and 46 of the nut and portions 38 and 37 of the bolt in this construction, and surface portions 46 and 37 are formed and corelated to form an additional pair of surfaces coactive to effect initial screwing on of the nut and self-locking of the bolt and nut threads.

It will be obvious that, with engaged threads formed as shown in Fig. 5, surface portions 44 and 46 on the nut thread will coact with surface portions 35 and 37 on the bolt thread, upon partial displacement of the threads to a position corresponding with that of threads 11 and 18 in Fig. 3, to first advance the nut to the work at the pitch rate, and that, when fully displaced by the reaction force to a position corresponding with that of threads 11 and 18 in Fig. 4, said surface portions will be jammed into self-locking relation and the abutment surface portions 33 and 42 will be coactive to effect additional advance of the nut for tight clamping if necessary.

In Figs. 6 to 9, another form of thread connection is illustrated, wherein the male and female threads have transversely curved abutment surface portions as well as transversely curved surface portions for advancing the nut to the work and locking the threads together, each thread being so formed that a cross-section thereof has no flat or straight edges. In the form illustrated, each of the two sides of the thread in cross-section extends in a reversing or ogee curve from the highest part of the thread rib to the lowest part of the thread groove.

Figure 6:
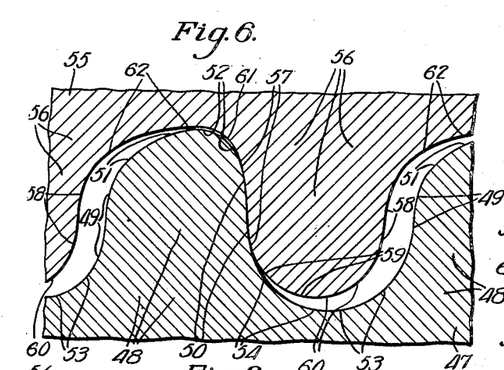
Figs. 6, 7 and 8 are views similar to Figs. 2, 3 and 4, respectively, showing a thread connection of the single self-locking bind type wherein the threads are formed without any flat surfaces or sharp angular corners, the bolt head being assumed to be at the left as in Fig. 1.
Figure 7:
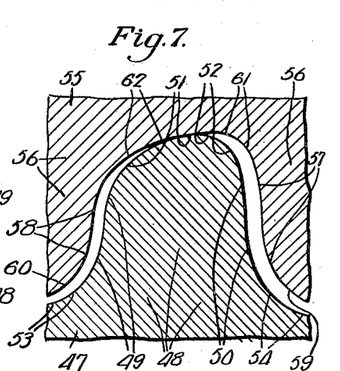
Figures 8, 9, 10:
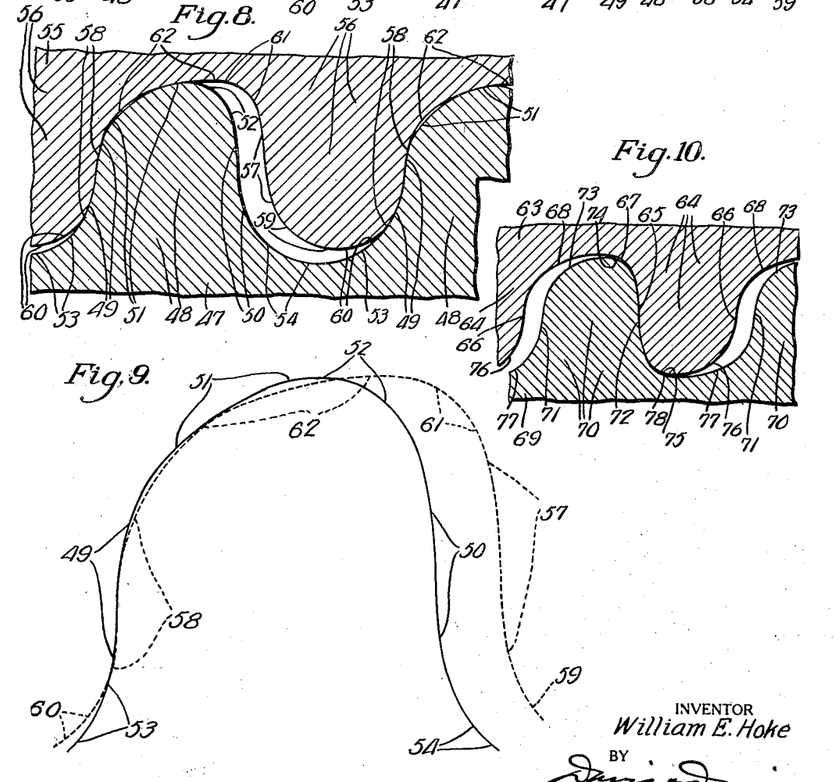
Fig. 9 is a diagrammatic view showing the outlines of the engaged bolt and nut threads of Figs. 6 to 8 on an enlarged scale, the bolt thread outline being shown with a full line and the nut thread outline with a broken line, and the nut thread being shown as it would appear if displaced axially in locking direction in a straight line parallel with the bolt axis from its screwing-off position a distance corresponding with the maximum extent of crosswise thread displacement.
Fig. 10 a view similar to Fig. 6, wherein each thread is given a continuously curving cross-sectional outline as in said Fig. 6, but the thread contours are such that each thread will take a self-locking grip on the other thread along two helicoidal surface portions instead of one.

The bolt 47 has its thread 48 formed with two oppositely facing, helicoidal, abutment surface portions 49 and 50 each having transversely thereof a reverse or ogee curvature, the sections of said abutment surface portions located farthest from the axial line of the bolt curving toward each other toward the top of the thread rib, and the sections thereof located nearest the axial line of the bolt curving away from each other toward the bottom of the thread groove. The edges of surface portions 49 and 50 located farthest from the axial line of the bolt merge smoothly with the outer edges of two oppositely facing, helicoidal, transversely curved, surface portions 51 and 52, respectively, the inner edges of which merge smoothly at the highest part of the thread rib to form a smooth convex surface portion for the upper top portion of the thread rib. The edges of abutment portions 49 and 50 located nearest the axial line of the bolt merge smoothly with the inner edges of two oppositely facing, helicoidal, transversely curved, surface portions 53 and 54, respectively, and the outer edge of portion 53 of each convolution of the thread merges smoothly with the outer edge of portion 54 of an adjacent convolution of the thread at the lowest part of the thread groove to form a smooth concave bottom surface for the thread groove.

The nut 55 has its thread 56 formed with two oppositely facing, helicoidal, abutment surface portions 57 and 58 each having transversely thereof a reverse or ogee curvature, the sections of said abutment portions located nearest the axial line of the nut curving toward each other toward the top of the thread rib, and the sections thereof located farthest from the axial line of the nut curving away from each other toward the bottom of the thread groove. The edges of surface portions 57 and 58 located nearest the axial line of the nut merge smoothly with the outer edges of two oppositely facing, helicoidal, transversely curved, surface portions 59 and 60, respectively, the inner edges of which merge smoothly at the highest part of the thread rib to form a smooth convex surface portion for the top portion of the thread rib. The edges of abutment portions 57 and 58 located farthest from the axial line of the nut merge smoothly with the inner edges of two oppositely facing, helicoidal, transversely curved, surface portions 61 and 62, respectively, and the outer edge of portion 61 of each convolution of the thread merges smoothly with the outer edge of portion 62 of an adjacent convolution of the thread at the lowest part of the thread groove to form a smooth concave bottom surface for the thread groove.

The surface portion 62 of the nut thread is curved to provide a relatively wide transversely curved outer section extending from end to end thereof having a slope relatively to the axial line of the nut within the angle of friction of the bolt and nut material, and an inner section extending from end to end thereof having a more decided curvature toward the axial line of the nut to connect the outer section with abutment portion 58 with a decidedly rounded corner. Surface portion 51 of the bolt thread is curved to provide a relatively narrow inner section extending from end to end thereof opposed to and coactive with the wider outer section of surface portion 62 and having a slope relatively to the axial line of the bolt within the angle of friction of the bolt and nut material, and an outer section extending from end to end thereof having a more decided curvature toward the axial line of the bolt to connect the inner section with abutment surface portion 49 with a decidedly rounded corner.

The outer section of portion 51 is preferably given a somewhat less sharp curvature than the inner section of portion 62, as more clearly apparent in Fig. 8, so that there will be a slight clearance between these surface sections upon self-locking of the other surface sections of portions 51 and 62, and so that abutments 49 and 58 will be certain to come in contact after self-locking of the engaged sections of portions 51 and 62, this construction insuring proper coaction of the threads without requiring the greatest precision in cutting the curved surfaces 51 and 62. The abutment portions of the nut and bolt threads are given such curvature that they lie without the angle of friction relatively to the axial line of the threads.

There is a slight clearance between portions 62 and 61 on the one hand and portions 51 and 52 on the other hand, and also between portions 59 and 60 on the one hand and portions 54 and 53 on the other hand, in the unscrewing position of the threads shown in Fig. 6, and a relatively great clearance between abutment portions 49 and 58, for the same purposes as in the constructions heretofore described. Portions 59 and 60 of the nut thread and portions 54 and 53 of the bolt thread are so curved and corelated that these nut and bolt thread surfaces do not contact in either of the positions shown in Figs. 6 to 8 and do not coact to resist axial forces. In Fig. 7 the portions 51 and 62 are shown in position for turning in light contact to advance the nut toward the bolt head, and in Fig. 8 the portions 51 and 62 are shown jammed into self-locking relation by a crosswise displacement thereof while in contact, causing the sections thereof sloping within the angle of friction to slightly expand the nut thread radially and grip each other under the elastic tension of the nut.

In order that the reversely curved abutment portions 50 and 57 may abut from edge to edge these portions are curved and corelated to lie parallel with each other in the unscrewing position of the threads, as shown in Figs. 6 and 9. In order that the reversely curved abutment portions 49 and 58 may abut from edge to edge in the self-locked position of the threads, these surfaces are curved and corelated to lie parallel with each other in the self-locked position of the threads, as shown in Fig. 8, said surfaces not being parallel in the unscrewing position of the threads, as will be apparent from Fig. 9. In other words the two threads are formed with abutment surface portions 49 and 58 of the same curvature, but portion 49 is slightly offset radially outward from the axial line of the bolt relatively to surface portion 58 when the threads are in free-turning relation to an extent equal to the extent of temporary radial displacement of these portions by the crosswise displacement (while in contact) of the portions 51 and 62.

In Fig. 10 is shown a thread connection similar to that shown in Figs. 6 to 8, except that in lieu of surface portions 59 and 60 of the nut thread and surface portions 54 and 53 of the bolt thread there are provided surface portions for also effecting binding of the threads together near the top of the nut thread rib and the bottom of the bolt thread groove, as in the case of the connection shown in Fig. 5.

In this construction the nut 63 has its thread 64 formed with reversely curved abutment portions 65 and 66 similar to abutments 57 and 58 of thread 56 of nut 55, and curved portions 67 and 68 forming the bottom of the thread groove similar to portions 61 and 62 of thread 56. The bolt 69 has its thread 70 formed with reversely curved abutment portions 71 and 72 similar to abutments 49 and 50 of thread 48 of nut 47, and curved portions 73 and 74 forming the top of the thread rib similar to portions 51 and 52 of thread 48. The nut thread is formed with curved surface portions 75 and 76, forming the top of the thread rib, similar to surface portions 74 and 73, respectively, of the bolt thread, but reversely arranged, and the bolt thread is formed with curved surface portions 77 and 78, forming the bottom of the thread groove, similar to surface portions 68 and 67, respectively, of the nut thread, but reversely arranged.

Surfaces 75 and 76 are corelated with surfaces 78 and 77 to provide a slight clearance in the position of the parts shown in Fig. 10, and surfaces 76 and 77 are corelated to jam on each other in self-locking relation before the abutments 66 and 71 contact, just as in the case of surfaces 68 and 73, which latter surfaces, of course, function exactly as surfaces 62 and 51 in the construction shown in Figs. 6 to 8, and heretofore described.

It will be noted that in each of the forms of thread connections shown and described, one thread has a transversely curved surface portion displaceable crosswise of a transversely curved surface portion of the other thread while in contact from free-turning relation into self-locking relation therewith; that the extent of displacement in a direction effecting self-locking is limited positively by abutment surfaces on the threads which come into engagement after self-locking is effected; that the self-locking surface portions slope relatively to the axial line of the threads within the angle of friction; and that the abutment surfaces lie outside the angle of friction.

While portions 23, 30, 35, 44, 37, 46, 51, 62, 73, 68, 77 and 76, of the several threads have been, for convenience, described as thread surface portions each divided longitudinally into two sections, it will be obvious that the so-called "section" of each of these surface portions, which coacts with an opposed surface portion to advance the nut and lock the threads, in itself constitutes a helicoidal, transversely curved, surface portion of the thread on which it is formed, and that the remaining "section" of each of these surface portions also constitutes a helicoidal, transversely curved, thread surface portion.

It will be seen that in each of the constructions illustrated, the threads are formed without sharp angular corners and that the cross sections of the threads are such that they may be easily and rapidly cut, and may be cut with a minimum of wear on the cutting tool. The form of the threads is also such that formation of burrs in cutting the threads is eliminated or reduced to a minimum. An important advantage present in each construction, resulting from the provision of the transversely curved jam surface portions, is that the coacting initial-screwing and self-locking jam surface portions of the male and female threads are so formed that they will easily wedge together, and will move crosswise, one relatively to the other, without any biting of an edge of either of the two telescoping surfaces into the other surface which would injure and deform the self-locking surfaces.

What I claim is:

1. In combination, a bolt and a nut in threaded engagement, the bolt and nut threads being of equal and constant pitch, and the cross-sectional contours of the threads being such as to permit substantial crosswise displacement between the engaged threads and to provide a pair of helicoidal abutment surface portions coactive to limit positively crosswise thread displacement in the direction of disconnection of the bolt and nut and a pair of helicoidal surface portions each having a transverse curvature and coactive to bind one on the other in self-locking frictional engagement upon crosswise displacement of the threads in the direction of disconnection before such displacement is arrested by engagement of said pair of abutment surface portions.

2. A self-locking and tight-clamping fastening means comprising, in combination, a headed bolt and a nut provided with complementary screw threads having two coacting helicoidal initially-acting nut-advancing surface portions displaceable crosswise of each other while in contact and two coacting helicoidal finally-acting nut-advancing surface portions engageable only after displacement of the initially-acting surface portions while in contact in the direction of disconnection of the nut and bolt, said initially-acting surface portions being curved transversely thereof and sloping relatively to the axial line of the threads within the angle of friction of the thread surfaces, the initially acting surface portion of the bolt thread facing toward the head of the bolt and the initially acting surface portion of the nut thread facing away from the bolt head, and the finally acting surface portions of the two threads lying without the angle of friction of the thread surfaces relatively to the axial line of the threads and being engageable only upon crosswise displacement of the initially acting surfaces while in contact into self-locking engagement.

3. A tight-holding fastening means comprising, in combination, a nut and a bolt threaded for screwing together and screwing apart, the bolt and nut threads being of equal pitch and the thread pitch being constant, the nut and bolt threads having coactive helicoidal surface portions forceable one across the other while in engagement by reaction force incident to screwing the nut on the bolt into work-holding position, and said threads having coactive helicoidal abutment surface portions lying transversely thereof without the angle of friction of the thread surfaces relatively to the axial line of the engaged threads and corelated to limit positively the extent of said relative crosswise movement of the first-mentioned surface portions, one of said first-mentioned surface portions being curved transversely thereof and sloping relatively to the axial line of the thread on which it is formed within the angle of friction of the thread surfaces in a direction to cause jamming of the threads into self-locking relation by said reaction force.

4. A self-locking and tight-clamping fastening means comprising, in combination, a bolt having a head and a male screw thread, and a nut having a female screw thread of the same pitch as the male thread corelated with the male thread for screwing of the nut on and off the bolt, said threads each having a pair of oppositely facing, helicoidal, surface portions lying transversely thereof without the angle of friction of the thread surfaces relatively to the axial line of the thread, said surface portions of the threads being corelated to permit substantial crosswise displacement within fixed limits between the threads, and said threads each having a helicoidal, transversely curved, surface portion sloping transversely thereof relatively to the axial line of the thread within the angle of friction of the thread surfaces, said transversely curved surface portions of the threads being opposed to each other and corelated to jam into self-locking relation upon crosswise displacement of the threads in the direction of disconnection of the bolt and nut and to turn freely relatively to each other upon crosswise displacement of the threads in the direction of connection within the limits of displacement determined by the first-mentioned surface portions of the two threads.

5. In combination, a member having a male screw thread, and a second member having a female screw thread engaged with the male thread of the first-mentioned member, the male and female threads having opposed sides coactive to cause one member to travel relatively to the other in one direction upon a relative turning movement between the members, each of said coactive sides of the threads having two surface portions extending from end to end of the thread side and curved transversely thereof and an intermediate surface portion extending from end to end of the thread side, the two transversely curved surface portions of one thread being opposed to and movable crosswise of the two transversely curved surface portions of the other thread while in engagement therewith and the curved surface portions of both threads sloping within the angle of friction of the thread surfaces, and the intermediate surface portions of the two threads being opposed to each other and lying without the angle of friction of the thread surfaces and corelated to engage each other after jamming of the opposed transversely curved surface portions of the threads into self-locking relation by crosswise displacement of the engaged threads in one direction.

6. In combination, a pair of members having engaged male and female screw threads of constant pitch, having coacting helicoidal transversely curved jam portions movable into and out of self-locking relation by relative straight-line displacement between the engaged threads, and coacting helicoidal non-jamming portions spaced apart when said jam portions are out of self-locking relation and corelated to limit positively the extent of displacement between the threads in the direction effecting jamming of the jam portions.

7. In combination, a pair of relatively rotatable members having engaged male and female screw threads, two opposed helicoidal side faces of the engaged threads each having a transversely curved surface portion extending from end to end thereof, said transversely curved surface portions of said side faces being of different widths and opposed to each other and corelated for crosswise displacement from free-turning relation into self-locking jammed relation, and said side faces of the two threads also having opposed surface portions extending from end to end thereof and corelated for engagement only after jamming of the opposed curved surface portions, said curved portions sloping relatively to the axial line of the threads within the angle of friction of the thread faces, and the surface portions which are engageable after jamming of said curved portions being disposed relatively to the axial line of the threads without the angle of friction of the thread faces.

8. A nut, for use in a tight-holding bolt and nut fastening, having an internal screw thread of constant pitch, said thread having the side thereof which is subject to reaction stress in screwing the nut on a bolt formed with a helicoidal, initial-screwing and self-locking bolt-thread-engaging surface portion curved transversely thereof and sloping slightly relatively to the axial line of the nut, and also formed with a helicoidal, bolt-thread-engaging, final-screwing, surface portion disposed transversely thereof abruptly relatively to the axial line of the nut.

9. A tight-holding nut having a thread one face of which is formed with two helicoidal surface portions corelated for engagement one after the other with a complementary bolt thread by relative crosswise displacement in one direction between the nut thread and a bolt thread engaged therewith, the surface portion first engageable with the bolt thread being curved transversely thereof and sloping relatively to the axial line of the nut within the angle of friction, and the surface portion last engageable with the bolt thread lying relatively to the axial line of the nut without the angle of friction.

10. A bolt, for use in a tight-holding bolt and nut fastening, having a male screw thread of constant pitch, said thread having the side thereof which is subject to reaction stress in screwing a nut on the bolt formed with a helicoidal, initial-screwing and self-locking, nut-thread-engaging, surface portion curved transversely thereof and sloping slightly relatively to the axial line of the bolt, and also formed with a helicoidal, final-screwing, nut-thread-engaging surface portion disposed transversely thereof abruptly relatively to the axial line of the bolt.

11. A tight-holding bolt having a thread one face of which is formed with two helicoidal surface portions corelated for engagement one after the other with a complementary nut thread by relative crosswise displacement in one direction between the bolt thread and a nut thread engaged therewith, the surface portion first engageable with the nut thread being curved transversely thereof and sloping relatively to the axial line of the bolt within the angle of friction, and the surface portion last engageable with the nut thread lying relatively to the axial line of the bolt without the angle of friction.

12. A tight-holding screw element having a thread formed at one side thereof from end to end with three helicoidal reaction taking surface portions of equal pitch, the intermediate surface portion being disposed abruptly transversely thereof relatively to the axial line of the thread, and the remaining two surface portions being curved transversely thereof in different directions and sloping slightly relatively to the axial line of the thread.

13. A tight-holding screw element having a thread formed at one side thereof with a transversely curved, helicoidal, reaction surface portion having a slight slope transversely thereof relatively to the axial line of the thread, and with a helicoidal reaction surface portion disposed transversely thereof abruptly relatively to the axial line of the thread for limiting wedging movement of a thread on said first-mentioned surface portion.

14. A pair of screw thread connected members having engaged male and female screw threads corelated for crosswise displacement, said threads having opposed coactive side faces each having two helicoidal-reaction taking surface portions curving transversely thereof in opposite directions and of different widths, the wider surface portion on each thread being opposed to and coactive with the narrower surface portion on the other thread and the coactive opposed surface portions curving transversely thereof in the same direction, said curved surface portions each sloping sufficiently slightly relatively to the axial line of the threads to permit jamming of the curved surface portions of one thread into self-locking engagement with the curved surface portions of the other thread upon crosswise displacement of the threads in one direction.

15. In combination, a bolt and a nut having threads cooperable for screwing of the nut on and off the bolt, the thread groove in one of said members having a concave arcuate bottom and the thread rib on the other of said members having a convex arcuate top and being substantially narrower than said groove, the arcuate top of said rib being corelated with the arcuate bottom of the groove for relative movement therebetween while in contact from a free-turning relation into a self-locking relation in which the nut thread is jammed on the bolt thread in slightly expanded condition upon crosswise displacement of the engaged nut and bolt threads in the direction of disconnection of the bolt and nut.

16. In combination, a pair of relatively rotatable parts having engaged male and female screw threads, the thread grooves in said parts having concave arcuate bottoms and the thread ribs on said parts having convex arcuate tops, the ribs being substantially narrower than the grooves, and the tops of the ribs being corelated with the bottoms of the grooves to effect a slight expansion of the female thread and jam the threads into self-locking engagement with each other along the tops of the thread ribs and the bottoms of the thread grooves upon crosswise displacement between the engaged threads in one direction.

17. In combination, a pair of relatively rotatable parts having engaged male and female screw threads, the thread grooves in said parts being substantially wider than the thread ribs, the thread groove in one part having a concave arcuate bottom, and the thread rib on the other part having a convex arcuate top corelated with said groove bottom to effect a slight expansion of the female thread and cause the said groove bottom and rib top to take a self-locking grip on each other upon crosswise displacement between the engaged threads in one direction.

18. In combination, a bolt and a nut having engaged male and female screw threads, the thread ribs on said parts being substantially narrower than the thread grooves in the parts, the thread groove in one part having a concave arcuate bottom and the thread rib on the other part having a convex arcuate top corelated with said groove bottom to effect a slight expansion of the female thread and cause the said groove bottom and rib top to take a self-locking grip on each other upon crosswise displacement between the engaged threads in the direction of disconnection of the nut and bolt, and the thread ribs on the said parts having coactive opposed abutment surface portions engageable by a thread displacement effecting self-locking of the threads, said abutment surface portions being of large depth as compared with the total depth of the thread grooves and disposed sufficiently abruptly to the axial line of the threads to limit positively the thread displacement in the direction of disconnection of the bolt and nut.

19. In combination, a pair of relatively rotatable parts having engaged male and female screw threads, the thread grooves having concave arcuate bottoms and the thread ribs having convex arcuate tops, the ribs being substantially narrower than the grooves, the tops of the ribs being corelated with the bottoms of the grooves to effect a slight expansion of the female thread and jam the threads into self-locking engagement with each other along the tops of the ribs and the bottoms of the grooves upon crosswise displacement between the engaged threads in one direction, and the ribs having coactive opposed helicoidal abutment surface portions engageable by a crosswise thread displacement effecting self-locking of the threads and disposed sufficiently abruptly to the axial line of the threads to limit positively the extent of said displacement, said abutment surface portions being of large depth as compared with the total thread depth.

20. In combination, a pair of relatively rotatable parts having engaged male and female screw threads, the thread grooves in said parts being substantially wider than the thread ribs, the thread groove in one part having a concave arcuate bottom, the thread rib on the other part having a convex arcuate top corelated with said groove bottom to effect a slight expansion of the female thread and cause the said groove bottom and rib top to take a self-locking grip on each other upon crosswise displacement between the engaged threads in one direction, and the ribs having coactive opposed helicoidal abutment surface portions engageable by a crosswise thread displacement effecting self-locking of the threads and disposed sufficiently abruptly to the axial line of the threads to limit positively the extent of said displacement, said abutment surface portions being of large depth as compared with the total thread depth.

In testimony whereof I hereunto affix my signature.

WILLIAM E. HOKE.